Patented July 6, 1937

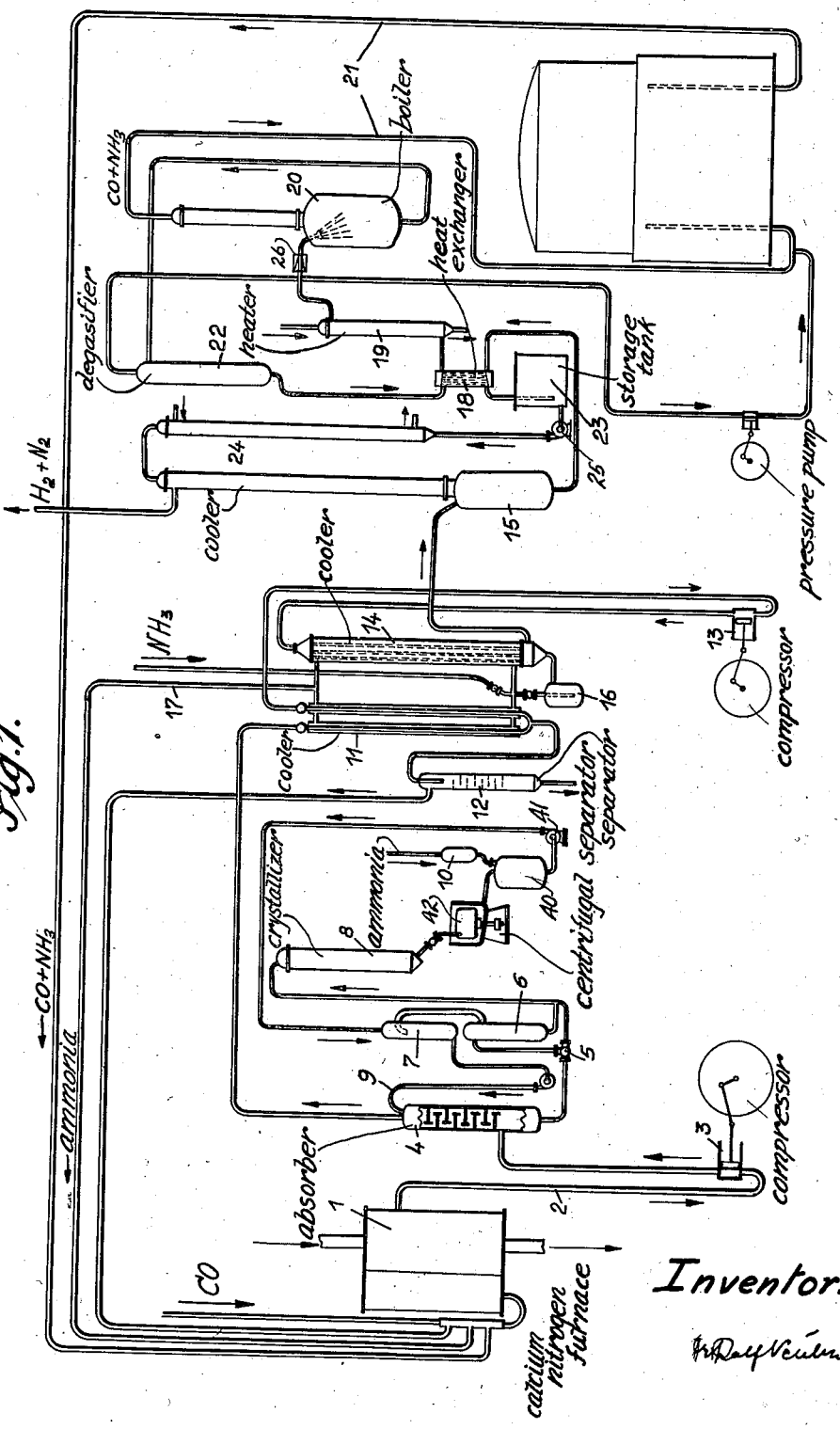

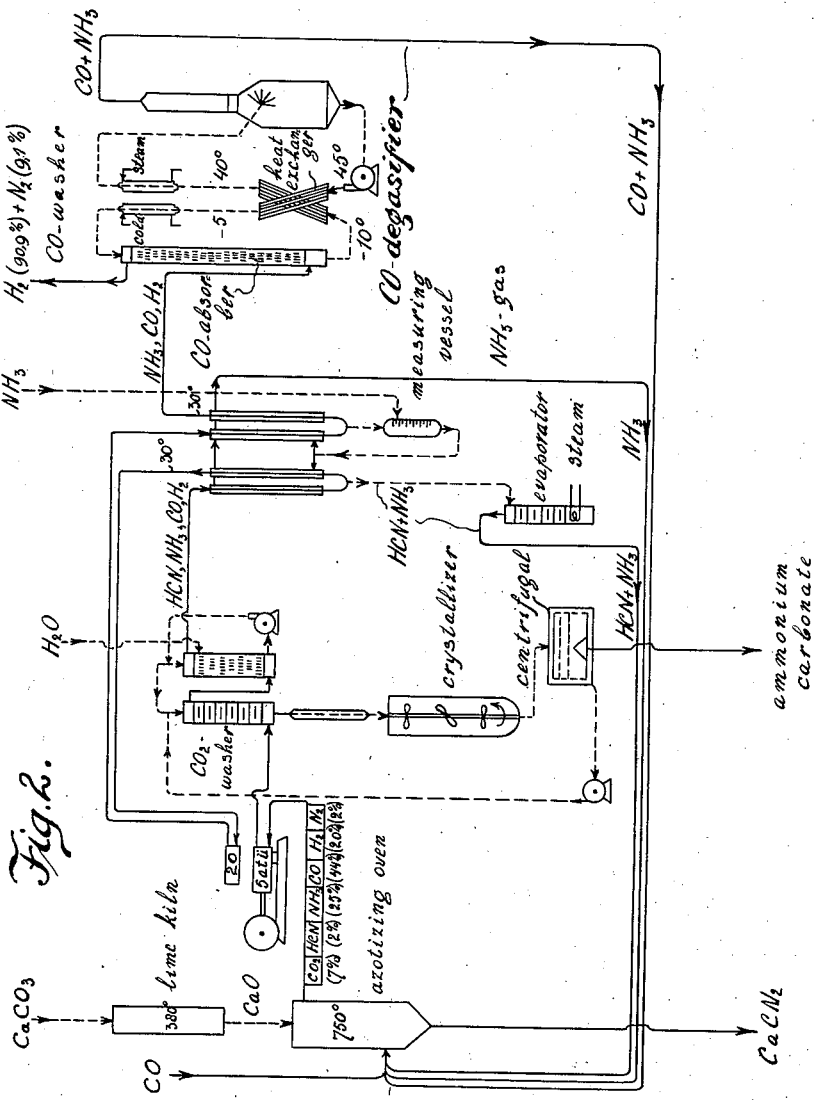

2,086,171

UNITED STATES PATENT OFFICE 2,086,171

PROCESS OF TREATING THE RESIDUAL GASES FORMED IN THE PRODUCTION OF CALCIUM CYANAMIDE FROM AMMONIA

Rolf Neubner, Piesteritz, near Wittenberg, Germany, assignor to Bayerische Stickstoff-Werke Aktien-Gesellschaft, Berlin, Germany Application November 6, 1933, Serial No. 696,853
In Germany November 7, 1932

16 Claims. (Cl. 23—79)

The present invention relates to a process of treating the residual gases formed in the production of calcium cyanamide from ammonia.

When calcium cyanamide is produced by the interaction of calcium carbonate, calcium oxide or from compounds, which when heated form calcium oxide, and ammonia or hydrocyanic acid, or ammonia and carbon monoxide, or carbon dioxide, or similar gas mixtures, a residual gas mixture is formed, which consists of ammonia, carbon dioxide, carbon monoxide, hydrogen, nitrogen and hydrocyanic acid. In order that the process may be carried out in an economical manner it is necessary that this residual gas mixture be utilized and more particularly the ammonia and carbon monoxide recovered. The known processes of treating such gas mixtures cannot be used in this case since these processes are designed to recover a definite constituent which as a rule is present only in a small percentage. Obviously such processes are not suitable for use when it is desired to completely separate and recover a plurality of gases which are partly present in substantially equal quantities.

In the drawings affixed to this specification and forming part thereof

Fig. 1 is a diagrammatic view of an arrangement suitable for carrying out the invention, while Fig. 2 is a flow sheet showing in a conventional form the reagents used in the new process, the products formed and the direction of their passage through the process stages.

According to the present invention the treatment of the residual gases obtained in the production of calcium cyanamide is effected in the following manner: The carbon dioxide and the hydrocyanic acid are first separated out in the form of ammonium salts or of solutions of such salts by means of the ammonia which is present in the gas mixture. If ammonia is not present in a quantity sufficient to bind the said acids, a suitable amount of ammonia may be added. All or part of the ammonia remaining over after the condensation of said gases may be condensed or may be conducted together with the carbon monoxide into the washer where the carbon monoxide is washed under pressure. The nitrogen and hydrogen escaping from this washer are pure and may for instance be used in the synthetical production of ammonia. By releasing the pressure or by other known expedients the carbon monoxide may be recovered in pure state either by itself or together with the ammonia and these gases may thereupon be returned into the process or may be utilized for other purposes. According to this invention the carbon dioxide is removed quantitatively in the first washing stage with the aid of a solution which only absorbs carbon dioxide and so much of the ammonia as is required to convert the carbon dioxide into a solid ammonium salt. The ammonia content of the washing liquor depends upon the temperature of the liquor and the partial pressure of the ammonia and carbon dioxide in the gas mixture. After a plurality of circulations the vapor tension of the ammonia corresponds to the partial pressure of the ammonia in the gas mixture in the washer. When part of the ammonia is removed from the solution in the form of a solid ammonium salt and the mother liquor is used as washing liquor, then only so much ammonia is taken up as is required for separating out the ammonia in the form of a solid ammonium salt. The washing solution absorbs in the beginning a certain quantity of hydrocyanic acid which remains in the solution when the solid carbonic acid compounds separate out. After a plurality of circulations the mother liquor is saturated with hydrocyanic acid and will not absorb any more of this acid. At a second stage the hydrocyanic acid is separated out quantitatively, together with another part of the excess of ammonia in the gas mixture in the form of ammonium cyanide dissolved in liquid ammonia. By evaporating this solution in a special separator a gas mixture is obtained which only contains ammonia and hydrocyanic acid. The gas mixture may during the circulation be caused to flow back into the azotizing furnace or may be utilized for producing other cyanogen salts. After the hydrocyanic acid has been absorbed the gas mixture still contains ammonia, carbon monoxide, hydrogen and nitrogen.

The absorption of the hydrocyanic acid may be effected in a similar known manner by means of organic compounds, for instance carbonic acid esters, which particularly at very low temperatures are able to absorb considerable quantities of hydrocyanic acid. Also in this case the hydrocyanic acid is taken up and recovered together with ammonia.

At a third stage the ammonia can be condensed and separated out in the form of pure liquid ammonia which after evaporation may be returned into the azotizing furnace. The ammonia may, however, also be absorbed together with the carbon monoxide in the washer serving to wash the carbon monoxide under pressure or it may be separated out in the form of an aqueous ammonia solution before the washing of the carbon oxide takes place. All steps of separating out the ammonia may be carried out separately or in combination in accordance with known methods.

In a last stage the carbon monoxide is separated from the residual gases (hydrogen and nitrogen) according to a known manner by means of a copper solution, whereupon the carbon monoxide is returned into the azotizing process either pure or mixed with ammonia. Removal of carbon monoxide from gases by absorption in ammoniacal solutions of copper salts is well known, see Dely Patent 1,597,345 issued August 24, 1926. The separation of the constituents of the gas mixture has then been performed in such a manner, that the constituents are well suited for use in the azotizing process.

The individual gases are preferably separated in the following manner: In one or a plurality of pressure washers connected in series the carbon dioxide is combined with ammonia to form a solution of ammonium salts of such concentration that solid ammonium salts of carbonic acid are formed when the solution is cooled. After the solid salt has been removed the mother liquor may be returned into the pressure washing device. It is particularly advantageous to conduct the washing liquor and the gas mixture in counter current and to raise the temperature of the liquor during the passage so that it will leave the washing apparatus at a temperature not higher than 78° C. The liquor is thereupon cooled to a temperature somewhat above the temperature of the cooling water (0–25° C.) in order to cause precipitation of the solid salt. On the other hand the gases should leave the washing apparatus at a temperature as low as possible. This temperature should be only little higher than the temperature of the mother liquor which flows into the washing apparatus. The composition of the washing liquor changes during the passage through the washing apparatus, in that the excess of free ammonia is highest when the liquor is introduced into, and is lowest—corresponding to the rise in temperature—when the liquor leaves the washing apparatus. In order that the carbon dioxide may be absorbed quantitatively it is necessary that free ammonia in excess be present in the liquor when it enters the washing apparatus. At this moment the liquor should preferably contain such an excess of ammonia, that the ammonia tension at 40° C. amounts to at least 0.4 atmosphere. Since the composition of the gas mixture or the ammonia and carbon dioxide content of this mixture may vary between 5% and 80% of ammonia and 1% to 14% of carbon dioxide in accordance with the working conditions existing in the azotizing furnace, these working conditions must be taken into consideration when determining the gas pressure and the concentration and temperature of the washing solution to be used in the carbon dioxide washing device. The gas pressure should as a rule be kept at such a value, that the partial pressure of the ammonia after the compression amounts at least to 0.5 atmosphere. Usually the ammonia content of the gas mixture entering the washing apparatus is so high, that the conditions mentioned above as regards the washing liquor are fulfilled. If the ammonia content of the gas mixture is insufficient the required excess of free ammonia in the introduced washing liquor may be obtained by introducing an additional quantity of gaseous or liquid ammonia.

The form in which the separated carbonic acid salts of ammonia are precipitated depends of course upon the composition of the washing liquor which leaves the washing devices. Ammonium salts such as for instance ammonium carbamate, ammonium bicarbonate and other known ammonium carbonates, can only be produced when certain known conditions as to the composition of the solution are maintained. For instance if it appears advantageous to separate out the carbonic acid in the form of ammonium carbonate, steps should be taken to ensure that the presence of an excess of free ammonia in the escaping liquor is avoided as far as possible. If the gas mixture contains only little ammonia as such this may be attained by maintaining the partial ammonia pressure in the gas mixture below 1 atmosphere and the temperature of the escaping liquor at 35–50° C. If the gas mixture contains a considerable excess of ammonia the washing liquor may be freed from this excess in a special separator.

By using higher compression and thereby raising the partial pressure of the ammonia with or without simultaneous increase of the temperature of the escaping liquor, the introduced mixture will furnish other ammonium carbonates, such as $(NH_4)_2CO_3.H_2O$ and finally also ammonium carbamate. In all cases the carbonic acid can be separated out quantitatively in the desired combination, if necessary by adding fresh ammonia to the mother liquor.

In the gases to be treated the excess of ammonia present and going into solution may for instance be such, that ammonium carbamate might separate out from the solution. This gas mixture may however also be caused to yield ammonium bicarbonate by adding carbon dioxide to the gases or by degassing the solution by releasing the pressure before cooling or by a combination of these steps. In that case pure ammonia will first escape and the solution will take up carbon dioxide, so that ammonium bicarbonate is formed when the solution is cooled. The degassing is particularly suitable in the case of solutions containing ammonia and carbon dioxide and less than 400 grams water per litre.

The solid salts obtained when washing the carbon dioxide may also be vaporized and the gases produced may be washed with water at reduced pressure, so that pure carbon dioxide is obtained as residual gas. The washing water used may again be degassed and the gases thus obtained may be added to the fresh gases before they enter the pressure washing apparatus.

*Example 1*

The gas mixture escaping from the azotizing furnace has the following composition:

| | Per cent |
|---|---|
| $NH_3$ | 35 |
| $CO_2$ | 7 |
| HCN | 2 |
| Residual gases ($CO, H_2, N_2$) | 56 |

It is intended to separate out the carbon dioxide in the form of $(NH_4)_2CO_3.H_2O$. The partial pressure of the ammonia is suitably raised, for instance from 0.35 atmosphere to 1.75 atmospheres, by compressing the residual gases to 5 atmospheres. The liquor formed in the washing apparatus is removed with a temperature of 55° C., in order to separate the crystals. The liquor formed under these conditions contains 320 grams ammonia, 330 grams carbon dioxide and 14 grams hydrocyanic acid per litre.

After the liquor has cooled down and the crystals have formed and been removed, the mother liquor contains

| | Grams |
|---|---|
| Ammonia | 312 |
| Carbon dioxide | 217 |
| Hydrocyanic acid per litre | 19 |

From 1 litre of the liquor are separated 112 grams of a salt the composition of which corresponds to the formula $(NH_4)_2CO_3.H_2O$. The mother liquor is directly returned into the working process at a temperature of 20° C. and after having once more passed the washing apparatus contains

| | Grams |
|---|---|
| Ammonia | 320 |
| Carbon dioxide | 330 |
| Hydrocyanic acid per litre | 14 |

The gas mixture leaving the carbon dioxide washing apparatus contains

| | Per cent |
|---|---|
| Ammonia | 26.6 |
| Hydrocyanic acid | 2.53 |
| Residual gases | 70.87 |

If the gas pressure of this mixture is raised for instance to more than 7–10 atmospheres before the carbon dioxide is washed the composition of the liquor changes in conformity with the raised partial pressure in the gas mixture in such a manner, that the liquor contains up to 600 grams ammonia and 120 grams hydrocyanic acid per litre. When this liquor is cooled the carbon dioxide is bound in the form of solid ammonium carbamate.

If the carbon dioxide shall be separated in the form of ammonium bicarbonate the conditions of operation must be altered correspondingly.

From the carbon dioxide washing apparatus the gas mixture, which still contains ammonia, hydrocyanic acid, carbon monoxide, hydrogen and nitrogen, is fed, preferably at the same pressure, into a condenser in which the gases are cooled to a temperature ranging between 0° C. and —30° C. Part of the ammonia separates out in liquid state and the hydrocyanic acid is retained quantitatively in this liquid ammonia in the form of ammonium cyanide. The solution containing hydrocyanic acid is preferably gasified in a separator or a similar apparatus at normal or reduced pressure or at a somewhat raised pressure, whereby an ammonia gas is obtained which contains hydrocyanic acid and which in the azotizing furnace may be returned into the cycle or may be used for producing cyanogen compounds. The absorption of the hydrocyanic acid in the form of ammonium cyanide may also be performed by producing a solution which for each molecule hydrocyanic acid contains only 2.5–3 molecules ammonia. The excess of ammonia in the gas mixture may also be separated out almost completely together with the hydrocyanic acid. By suitably choosing the temperature of condensation and the gas pressure any desired solution containing hydrocyanic acid may be produced. It is however advantageous to separate out the hydrocyanic acid in the form of a solution of ammonium cyanide of as high a concentration as possible and to return this solution into the cycle in the manner described above.

*Example 2*

The gas introduced in the hydrocyanic acid condensation stage contains

| | Per cent |
|---|---|
| Ammonia | 26.6 |
| Hydrocyanic acid | 2.53 |
| Residual gases | 70.9 |

At a total pressure of 5 atmospheres the gas is cooled to about —20° C. A solution will then separate out, which after gasification contains

| | Per cent |
|---|---|
| Ammonia | 76.0 |
| Hydrocyanic acid | 24.0 |

After having passed through the hydrocyanic acid condensation stage the gas mixture contains

| | Per cent |
|---|---|
| Ammonia | 22.2 |
| Residual gases | 77.8 |

The ammonia salts separated out during the carbon dioxide and the hydrocyanic acid stages may also be converted by treatment with acids into the corresponding ammonium salts. If for instance sulphuric acid is used ammonium sulfate is obtained.

After the hydrocyanic acid has been condensed the main part of the ammonia in the gas mixture can be condensed in a special condenser and preferably at increased gas pressure in the form of pure liquid ammonia, which is vaporized and returned into the azotizing furnace. The evaporation of the ammonia should preferably take place in the cooling chambers of the condenser at a pressure at which the desired condensation temperature is maintained. The evaporation of ammonia in the condenser in which the pure ammonia is produced is not sufficient to create the low temperature required in the hydrocyanic acid-ammonia-condenser and in the pure-ammonia-condenser and it is therefore necessary to introduce additional liquid ammonia. The quantity of liquid ammonia should preferably correspond to or be somewhat less than the quantity of ammonia which is removed from the cycle in the azotizing furnace and in the carbon dioxide washing apparatus. This measure involves the advantage that no additional energy is required in either condensation stage. It is however also possible to produce the required low temperatures by means of special refrigeration devices.

*Example 3*

Before the ammonia condensation takes place, the gas mixture contains

| | Per cent |
|---|---|
| Ammonia | 22.2 |
| Residual gases | 77.8 |

At a total pressure of 20 atmospheres the gas mixture is cooled to about —30° C. 77% of the introduced ammonia separates out in pure and liquid state. After condensation of the ammonia the gas mixture contains

| | Per cent |
|---|---|
| Ammonia | 6.0 |
| Residual gases | 94.0 |

After condensation of the ammonia the gas may, if desired, be passed through another washing device in which the residual ammonia is retained in the form of an aqueous ammonia solution, whereupon the gas is fed into the carbon monoxide washer in which the carbon monoxide may be absorbed in a well known manner and may be recovered in absolutely pure state by removing the pressure. Preferably about 25% ammonia are allowed to remain in the gas, since the absorption of carbon monoxide is thereby improved.

It is also possible, particularly if the fresh gases contain only little ammonia, to dispense with the pure-ammonia-condensation-stage and to absorb the ammonia together with the carbon monoxide in the pressure washing apparatus. From this apparatus a gas escapes which contains about 60–99% hydrogen and about 40–1% nitrogen.

An arrangement for carrying out the process is shown diagrammatically by way of example in the accompanying drawing. The values given and the constructional forms will of course vary widely in accordance with the varying composition of the gas mixture to be treated.

In the drawings 1 denotes the furnace in which the cyanamide is formed and from which the waste gases pass through the conduit 2 and compressor 3 into the absorption plant 4 in which the separation of the carbon dioxide takes place. From the absorber the washing liquor may pass through a pressure reducing valve 5 into a separator 6 if it is desired to obtain the carbon dioxide in the form of bicarbonate. In the separator 6 the excess of free ammonia is driven off by the drop of pressure, additional heat being applied if necessary. In an absorber 7 this ammonia is introduced into the cooled mother liquor which comes from the crystallizer 8 and is returned into the absorber 4 through a conduit 9. Between the absorbers heat exchange devices may be arranged. If absorption liquors are formed which contain only a small excess of ammonia or if other carbonic acid compounds are formed the separator 6 and the absorber 7 may be dispensed with. In this case it may become necessary to add ammonia from the vessel 10 by way of the vessel 40 and pump 41 to the mother liquor from the centrifugal 42 which is returned to the first absorber 4. In the crystallizer 8 (in which the mother liquor may be stirred) the moist mass of crystals may be separated from the mother liquor. The salt and the mother liquor forming this mass may be separated in a centrifugal separator such as 42 or by means of filters. The salt may be removed from the filters by means of water or salt solutions, for instance concentrated ammonium nitrate liquor. The salt may however also be recovered in pure state and be quantitatively freed from dissolved hydrocyanic acid by being washed with liquid ammonia or other suitable solvents. The gases which leave the absorber 4 and have been freed from carbon dioxide pass through a cooler 11, the hydrocyanic acid being separated out together with part of the ammonia in the form of a solution of ammonium cyanide in liquid ammonia. This solution may then be removed from the process. The hydrocyanic acid and ammonia are returned into the cyanamide process under the form of ammonium cyanide through a separator 12 in which only condensation water is formed.

The gas from which the hydrocyanic acid has been removed may be conducted, if necessary, through a higher compression stage 13 into the ammonia condenser 14 from which the non-condensed gas flows into the carbon monoxide washing column 15 which it leaves in the form of a pure hydrogen-nitrogen mixture.

The pure liquid ammonia formed in the condenser 14 flows into the receptacle 16 and through a pressure reducing valve into the cooling chambers of the devices 11 and 14 in which it is evaporated whereupon it returns in gaseous state to the furnace 1 through the conduit 17.

The copper liquor which contains carbon monoxide and ammonia is preferably preheated in a heat exchanger 18 and is thereupon heated to the degassing temperature of about 40°–65° C. by means of a heater 19, whereupon it passes through a reducing valve 26 and is injected through nozzles into a boiler 20. The carbon monoxide and the ammonia leave this boiler substantially at atmospheric pressure and may be returned into the azotizing process through the tube 21.

The solution freed from gases may be completely degassed in the column 22, preferably at reduced pressure and may thereupon be returned into the cycle through the heat exchanger 18, a storage container 23, a cooler 24 and a pressure pump 25.

Various changes may be made in the details disclosed in the foregoing specification without departing from the invention or sacrificing the advantages thereof.

I claim:

1. The process of treating the residual gases obtained in the production of calcium cyanamide from nitrogen compounds and calcium compounds and which contain ammonia, carbon monoxide, carbon dioxide, hydrocyanic acid, hydrogen and nitrogen, comprising compressing the gas mixture, washing same under pressure for the absorption of the carbon dioxide by the ammonia contained in the gas mixture, cooling the absorption solution to separate the carbon dioxide in the form of a solid ammonium salt, circulating the mother liquor through the carbon dioxide washing stage, condensing and cooling in two stages the ammonia remaining over after the removal of the carbon dioxide, in order to cause the hydrocyanic acid to separate out during the first stage in the form of a solution of ammonium cyanide in liquid ammonia and pure ammonia to be condensed under pressure in the second stage, and finally separating the carbon monoxide from the residual gases by washing said gases with a copper salt solution under pressure.

2. The process of claim 1, in which the condensation of the pure ammonia is effected in the second stage under a higher pressure than the separating out of the hydrocyanic acid in the first stage.

3. The process of claim 1, in which the carbon dioxide is removed from the original gas by washing under pressure in several stages, an excess of free ammonia being maintained in the last stage and a temperature not higher than 78° C. in the first stage at the point where the washing liquor leaves this stage, in order that carbonic acid salts of ammonium be recovered when the liquor is cooled.

4. The process of claim 1, which, if the percentage of ammonia present in the gases and which passes into solution is such that the resulting solution would yield ammonium carbamate, so much carbon dioxide is added to the mixture of gases, that on cooling ammonium bicarbonate is formed.

5. The process of claim 1, in which the gas washing solution is freed from ammonia by relieving the pressure before the solution cools down, whenever the percentage of ammonia in the gas mixture is such that the solution would yield ammonium carbamate.

6. The process of claim 1, in which carbon dioxide is added to the gas mixture.

7. The process of claim 1, in which the washing solution containing ammonia and carbon dioxide and which contains less than 400 grams water per litre is freed from ammonia by relieving the pressure before cooling, in order to enrich the solution with carbon dioxide.

8. The process of claim 1, in which the solid salts obtained by the washing out of the carbon dioxide under pressure are vaporized under reduced pressure and the vapors washed with water in countercurrent for the separation of pure ammonia and carbon dioxide to be returned into the cycle, and the obtention of pure carbon dioxide.

9. The process of claim 1, in which the condensates obtained by washing the hydrocyanic acid and by condensing the ammonia are turned in gaseous state into the calcium-nitrogen furnace.

10. The process of claim 1, in which the cold produced by the evaporation of the ammonia is utilized for separating out under high pressure the ammonia contained in the gases.

11. The process of claim 1, in which the second pressure stage is dispensed with, all of the ammonia being supplied to the carbon monoxide washer.

12. The process of claim 1, in which the ammonia and carbon monoxide from the copper solution washing operation are returned into the calcium-nitrogen furnace.

13. The process of claim 1, in which the mixture of nitrogen and hydrogen escaping from the carbon monoxide washer is treated for the synthetical production of ammonia which is then returned into the cycle.

14. The process of claim 1, in which, if the residual gases do not contain sufficient ammonia, so much ammonia is added that the carbon dioxide and the hydrocyanic acid separate out.

15. The process of claim 1, in which the carbon dioxide is removed from the original gas by washing under pressure in several stages in a single column, an excess of free ammonia being maintained in the last stage and a temperature not higher than 78° C. in the first stage at the point where the washing liquor leaves this stage, in order that carbonic acid salts of ammonium be recovered when the liquor is cooled.

16. The process of claim 1, in which the second pressure stage is dispensed with, part of the ammonia being condensed, while another part is supplied directly to the carbon monoxide washer.

ROLF NEUBNER.